US005778761A

United States Patent [19]

Miller

[11] Patent Number: 5,778,761

[45] Date of Patent: Jul. 14, 1998

[54] FLAVOR-INJECTED BLENDING APPARATUS

[75] Inventor: Eric R. Miller, Deland, Fla.

[73] Assignee: Archibald Bros. Fine Beverages, Inc., Deland, Fla.

[21] Appl. No.: 904,075

[22] Filed: Jul. 31, 1997

Related U.S. Application Data

[63] Continuation of Ser. No. 695,238, Aug. 8, 1996, Pat. No. 5,653,157.

[51] Int. Cl.[6] ....... A23L 2/00; B67D 5/00; B67D 5/56; B01F 7/00

[52] U.S. Cl. ....... 99/275; 99/290; 99/300; 99/468; 99/484; 222/129.1; 222/135; 222/146.6; 366/154.1; 366/197; 366/206; 366/601

[58] Field of Search ....... 99/275–300, 348, 99/516, 484, 468, 357, 334, 335; 366/154.1, 155.1, 197–200, 206, 207, 279, 131, 932, 601; 241/DIG. 17, 106.2; 222/146.6, 185, 129.1, 129.2, 144.5, 325, 105.2, 145.6

[56] References Cited

U.S. PATENT DOCUMENTS

| | | | |
|---|---|---|---|
| 1,681,929 | 8/1928 | De Armond et al. | 99/275 |
| 2,462,019 | 2/1949 | Bowman | 99/275 |
| 2,707,911 | 5/1955 | Charpiat | 99/275 |
| 2,712,887 | 7/1955 | King | 99/275 |
| 2,736,274 | 2/1956 | Atkins . | |
| 2,765,234 | 10/1956 | Schmitt et al. . | |
| 3,106,895 | 10/1963 | Hood | 99/275 |
| 3,276,633 | 10/1966 | Rahauser . | |
| 3,460,717 | 8/1969 | Thomas . | |
| 3,830,407 | 8/1974 | Wierlo . | |
| 3,934,759 | 1/1976 | Giannella et al. . | |
| 3,987,905 | 10/1976 | Muller | 99/275 |
| 4,580,905 | 4/1986 | Schwitters et al. | 366/156.1 X |
| 4,881,663 | 11/1989 | Seymour . | |
| 5,056,686 | 10/1991 | Jarrett . | |
| 5,152,429 | 10/1992 | Billings | 222/129.2 |
| 5,159,818 | 11/1992 | Etou et al. | 222/138 X |
| 5,203,366 | 4/1993 | Czeck et al. | 222/144.5 X |
| 5,251,790 | 10/1993 | Cohn et al. | 222/146.6 |
| 5,305,923 | 4/1994 | Kirschner et al. | 222/129.1 |
| 5,323,691 | 6/1994 | Reese et al. . | |
| 5,341,957 | 8/1994 | Sizemore . | |
| 5,553,749 | 9/1996 | Oyler et al. | 222/129.1 |
| B1 5,056,686 | 2/1993 | Jarrett . | |

*Primary Examiner*—Timothy F. Simone
*Attorney, Agent, or Firm*—Allen, Dyer, Doppelt, Milbrath & Gilchrist, P.A.

[57] ABSTRACT

A flavored shake drink is prepared from a prepackaged neutral flavored mix stored within a serving cup. A flavored syrup is selected and dispensed through a dedicated nozzle carried by a housing. Each of a plurality of nozzles is in fluid communication with a corresponding solenoid control valve which controls the flow of the selected syrup pumped from a bag-in-the-box styled reservoir. One reservoir is provided for each of the selected flavors. A manually activated programmable timer controls the length of time that the solenoid activated valve remains opened thus providing a preselected amount of syrup into the cup. Switches are provided for doubling and halving the amount of the preselected quantity of syrup when creating varying single flavored and combination flavored shakes. In addition to shielding provided around the blender spindle carried by the housing for maintaining the surrounding area in a clean condition, a protective sleeve is placed within the cup for limiting the amount of mix splashed from the cup during blending of the selected syrup and neutral flavored mix. Prior to adding a selected syrup, the cup of unflavored mix is stored in a tempering freezer where it is maintained at a pre-selected temperature suitable for providing desirable blending of the syrups with the mix.

25 Claims, 5 Drawing Sheets

FLAVOR-INJECTED BLENDING APPARATUS

This is a continuation of application Ser. No. 08/695,238 filed Aug. 8, 1996, and issuing as U.S. Pat. No. 5,653,157 on Aug. 5, 1997.

BACKGROUND OF INVENTION

1. Field of Invention

The present invention relates generally to the dispensing and mixing of multi-flavored food such as shakes, frozen custards, slushes and the like, and more particularly to utilizing a flavor-injected blender for mixing and dispensing such foods without the need for large storage facilities and costly equipment.

2. Background Art

Beverage dispensing systems are used to provide consumers with beverages that are typically a mixture of previously stored concentrate and water. Further, milk shake machines are available for use in fast-food styled restaurants, but such machines are typically expensive. In addition, storage of product used is typically within the machine thus demanding expensive retail space for placement and convenient use.

U.S. Pat. No. 5,056,686 to Jarrett discloses a beverage dispensing system for providing a number of different flavored drinks mixed from concentrate and water. The system has a number of containers for storing different flavors of concentrate and a piping system including a coupling adapted to receive pressurized water. Each container is in fluid communication with a specific fluid driven proportion pump that is also in fluid communication with the pumping system. Separate and fluid supply lines extend from each pump to a dispensing head. Valves in the dispensing head control the discharge of fluid therefrom so that when a selected beverage is desired, the appropriate concentrate and water are discharged simultaneously to ensure that the end beverage contains the appropriate mixture of concentrate and fluid.

U.S. Pat. No. 5,341,957 to Sizemore discloses a cup-type vending system which includes a vending machine having a currency output device and automatically outputs a beverage into a cup in response to an operator's payment and selection of a beverage. The vending machine includes a plurality of disposable containers of beverage syrup, such as "bag-in-box" packages, stored in an auxiliary cabinet. A dispensing system functions to draw syrup from the disposable containers and selectively dispense a predefined or selected amount of syrup into an awaiting cup. The system includes pumping stages wherein one stage draws a selected amount of syrup from a package through a feed conduit and discharges the selected amount through a nozzle into the cup.

U.S. Pat. No. 3,934,759 to Giannella et al. discloses a milk shake machine having a multiple mixing, blending and dispensing head for mixing and dispensing a variety of flavored milk shakes from one reservoir of unflavored comestible. Each head incorporates a premix chamber, wherein an unflavored, neutral comestible is injected under pressure, and is mixed under turbulence with a selected flavoring syrup which is also injected under pressure. A flexible shaft beater mixes the partially mixed comestible with the flavoring syrup and a triple port dispensing nozzle directs the mixed flavored milk shake into a container for serving.

U.S. Pat. No. 5,323,691 to Reese et al. discloses a frozen drink mixer for preparing blended beverages, particularly frozen drinks, in which an ice dispenser, liquid mix dispenser, and blender are combined into a single unit. The apparatus automatically delivers an appropriate amount of ice and liquid to the blender unit and turns on the blender at an appropriate time to prepare the frozen drink of desired size.

There remains a need to provide an inexpensive system to provide a flavored shake to a customer while maintaining low capital cost as well as low operating cost and do such while maintaining the cleanliness and health standards demanded in the industry. The present invention provides such a system.

SUMMARY OF INVENTION

In view of the foregoing background, it is therefore an object of the present invention to provide a system for efficiently and effectively preparing a, flavored food such as a comestible drink, such as a milk-shake styled drink within health conscience standards. As is well known, strict sanitation codes and enforcement of these codes create a need for improved and simplified food dispensing systems and methods. It is further an object to provide a variety of flavors while minimizing storage and expanding accessibility for such flavors. It is further an object to use such flavors with a neutral flavored, pre-packaged shake mix for use as a base to which selected flavors are dispensed. It is yet another object of the invention to minimize inventory needs typical in the ice cream counter styled restaurant and improve on the speed of service for such a restaurant.

These and other objects, features, and advantages of the invention, are provided by a system for preparing a comestible flavored food comprising a housing, connection means carried by the housing for fluid communication with a food flavoring reservoir, a nozzle carried by the housing, the nozzle in fluid communication with the connection means for dispensing a selected food flavoring into a cup positioned external to the housing, a value communicating with the connection means for controlling the food flavoring flow to the nozzle, the value further having means for selectively delivering a pre-defined amount of food flavoring to the nozzle in response to selection of a food flavoring by a user, and a blender carried by the housing, the blender having a spindle head external the housing for positioning into a cup for blending a food flavoring dispensed into the cup with a mix stored in the cup. Further, a reservoir is provided for storing a plurality of different food flavoring therein, along with a conduit communicating between the reservoir and the connection means, and pump means in fluid communication with the conduit for drawing food flavoring from the reservoir and supplying the food flavoring to the connection means. A selected flavored food mix is thus, prepared and served within a cup originally used for storing the mix.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that disclosure will be thorough and complete, and will fully convey the scope of the invention to those skilled in the art. Like numbers refer to like elements throughout.

Figure 1:
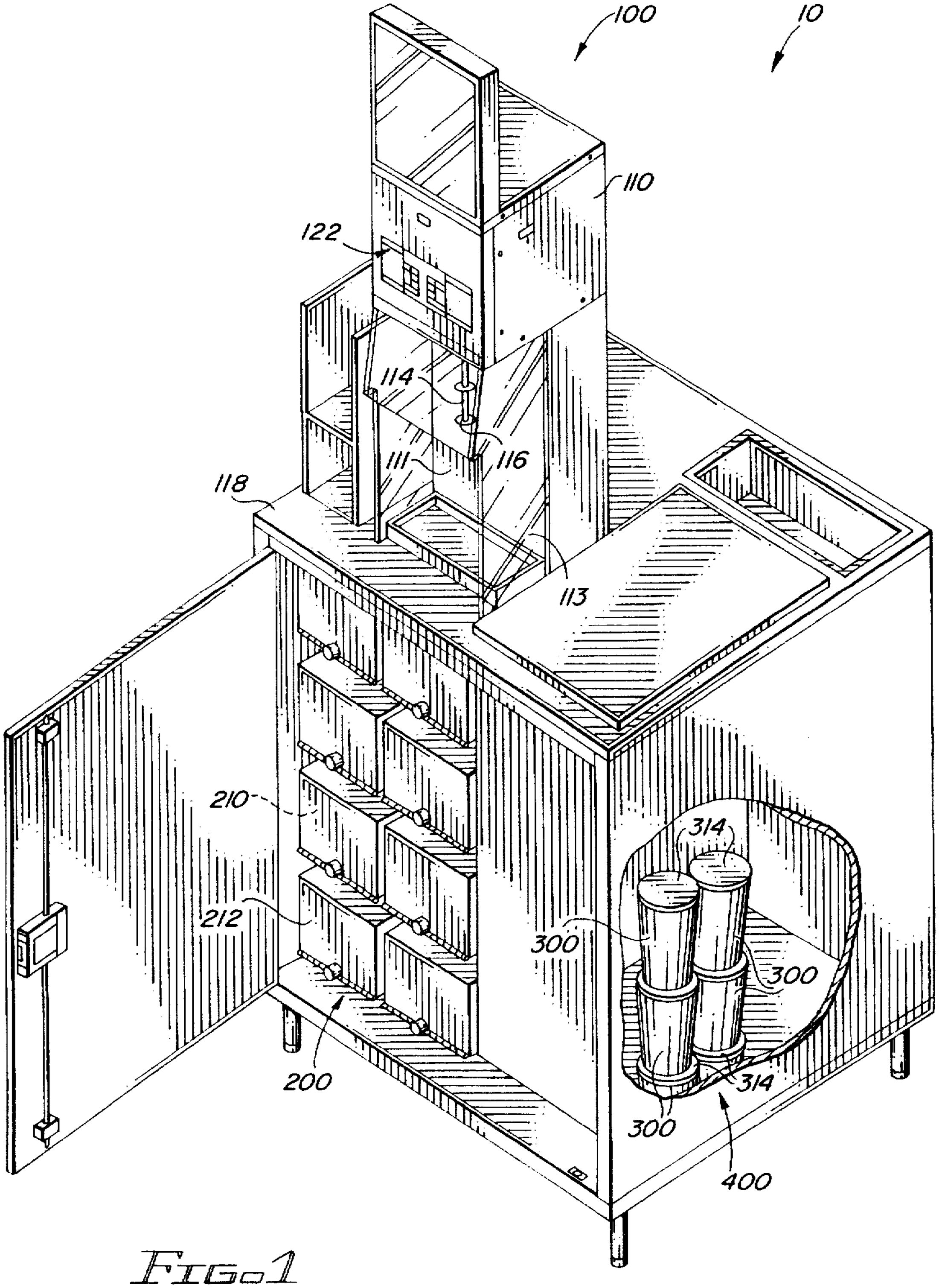
FIG. 1 is a perspective view of one preferred embodiment of the present invention illustrating a system for preparing a comestible flavored shake.

Referring initially to FIG. 1, a system 10 for preparing a flavored food such as a dessert, fruit drink or shake comprises a flavor-injected blending apparatus 100 for injecting a selected food flavoring or syrup stored in a bag-in-a-box styled syrup reservoir 200 into a container or cup 300 which is removed from its tempering freezer 400 for blending the selected syrup with a neutral flavored shake mix, by way of example, that has been stored within the cup 300.

Figure 2:
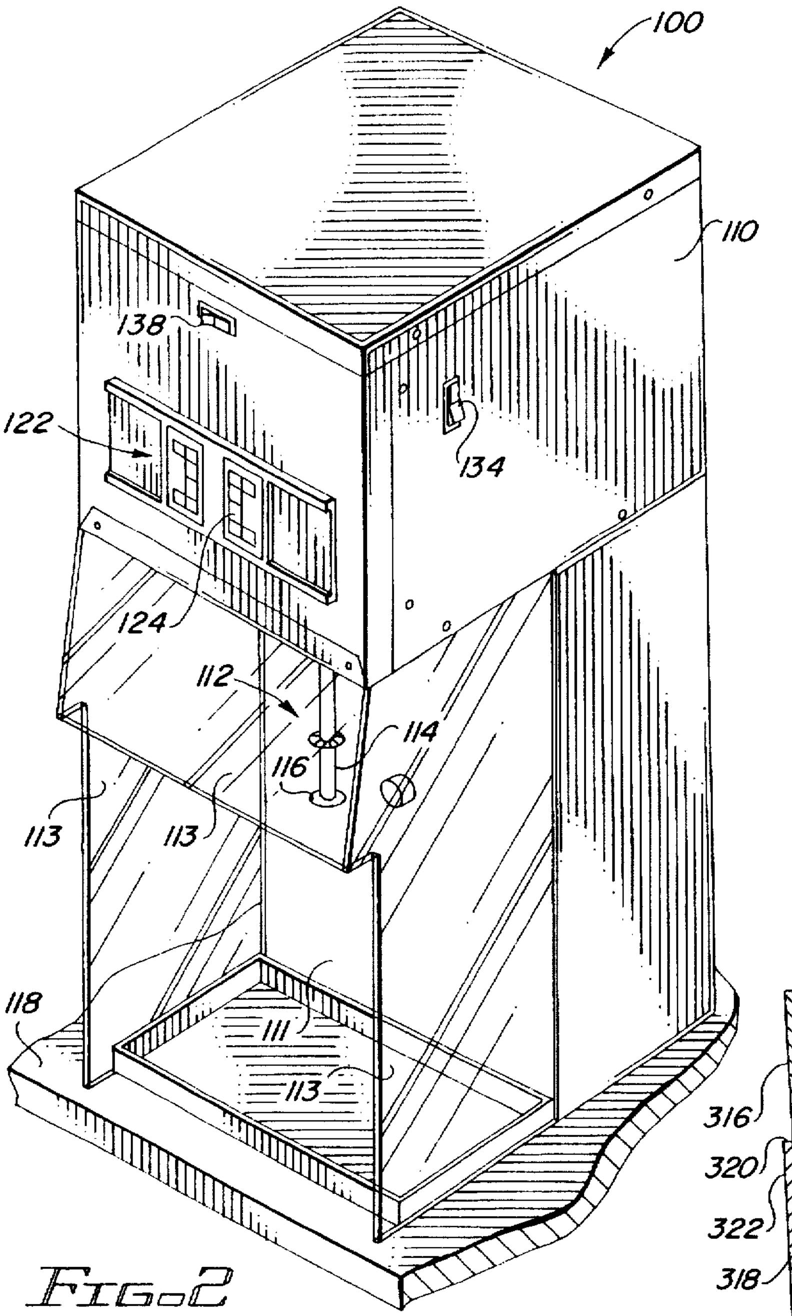
FIG. 2 is a perspective view of a syrup dispensing and blending apparatus of the present invention.
Figure 3:
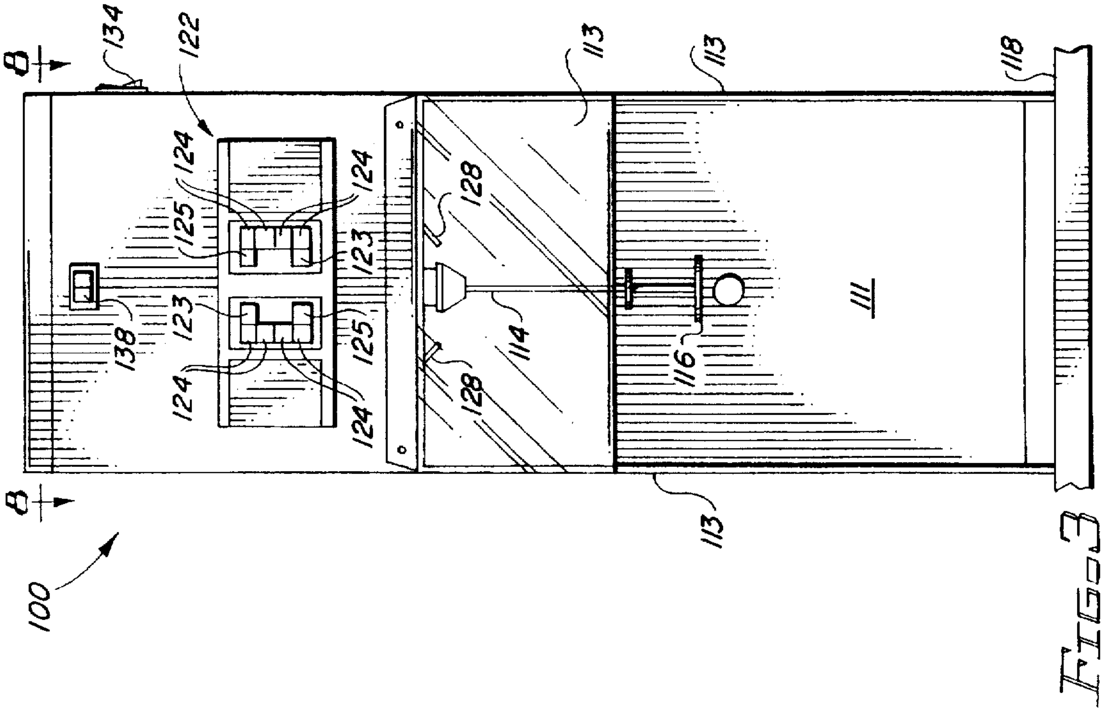
FIG. 3 is a front elevational view of the apparatus of FIG. 2.

As illustrated with reference to FIGS. 2 and 3, the flavor-injected blending apparatus 100 includes a housing 110. Blender means 112 includes a spindle 114 which extends external to the housing 110, and vertically downward, for having the cup 300 receive the spindle 114 during the blending of a selected food flavoring or flavored syrup 210 with a food base such as a neutral flavored shake mix 310 with the cup 300 as the cup 300 is manually held 312 for communication with mixing blades 116 of the spindle 114 for blending the selected syrup 210 with the shake mix 310, as illustrated with reference to FIG. 4. As further illustrated with reference to FIGS. 2–4, a housing wall portion 111 and transparent shield side and front panels 113 confine splattering of the mix 310 during the blending operation.

A flavored shake is prepared using the neutral flavored shake mix 310 which is prepackaged in the cups 300 and shipped to point of sale locations where the cups 300 are first stored in food freezers and selected quantities removed from the freezer storage and placed in the tempering freezer 400, as illustrated again with reference to FIG. 1, which tempering freezer 400 is conveniently positioned proximate the apparatus 100. By way of example, a food freezer may be set at approximately zero to minus ten degrees Fahrenheit for long term storage of the neutral mix 310 within the respective cups 300. The tempering freezer 400, in a preferred operation of the system 10, is set to maintain the stored neutral mix 310 within the cups 300, at a temperature between eighteen and twenty two degrees Fahrenheit. Such preferred staging of the neutral mix 310 within the tempering freezer 400 has been found to provide a consistent tasting shake desirable to the customer. The quantity of mix 310 or cups 300 stored in the tempering freezer 400 will be determined by the sales performance at any given store. The cup 300 is sealed with a lid 314 prior to and during storage. With such an arrangement, handling the mix 14 at the restaurant is done within strict health code standards and with little fear of contaminating the pre-packaged neutral mix 310. It is anticipated that a flexible foil styled lid 314 will be used for ease in handling for pealing of the lid 314 from the cup 300.

Figure 5:
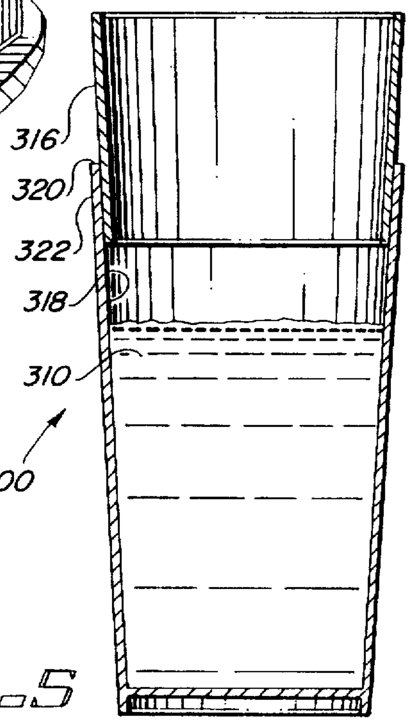
FIG. 5 is a cross-sectional view of a cup and sleeve inserted within the cup.

As illustrated again with reference to FIGS. 4 and 5, a sleeve 316 having open ends is inserted into the cup 300. The sleeve 316 enters at least partially into the cup 300 and is held in place by the cup inside wall 318. The sleeve 316 extends sufficiently above the cup rim 320 to prevent the mix 310 from splashing and hitting the cup outside wall surface 322 and surrounding counter 118 where the shake is being prepared. With such a sleeve 316 and use of the apparatus 100, the cup 300 used to store the neutral flavored mix 310 is also used to serve the resulting flavored shake to the customer.

It is well known in the soda fountain art to use a mixer that includes a mixing cup typically made of metal for preparing a shake. Once prepared, the flavored shake in then poured into a serving cup. Often, excess mixed shake is prepared only to be wasted because the size shake ordered does not accommodate the amount of shake prepared. Such problems are eliminated by the present invention.

Figure 6:
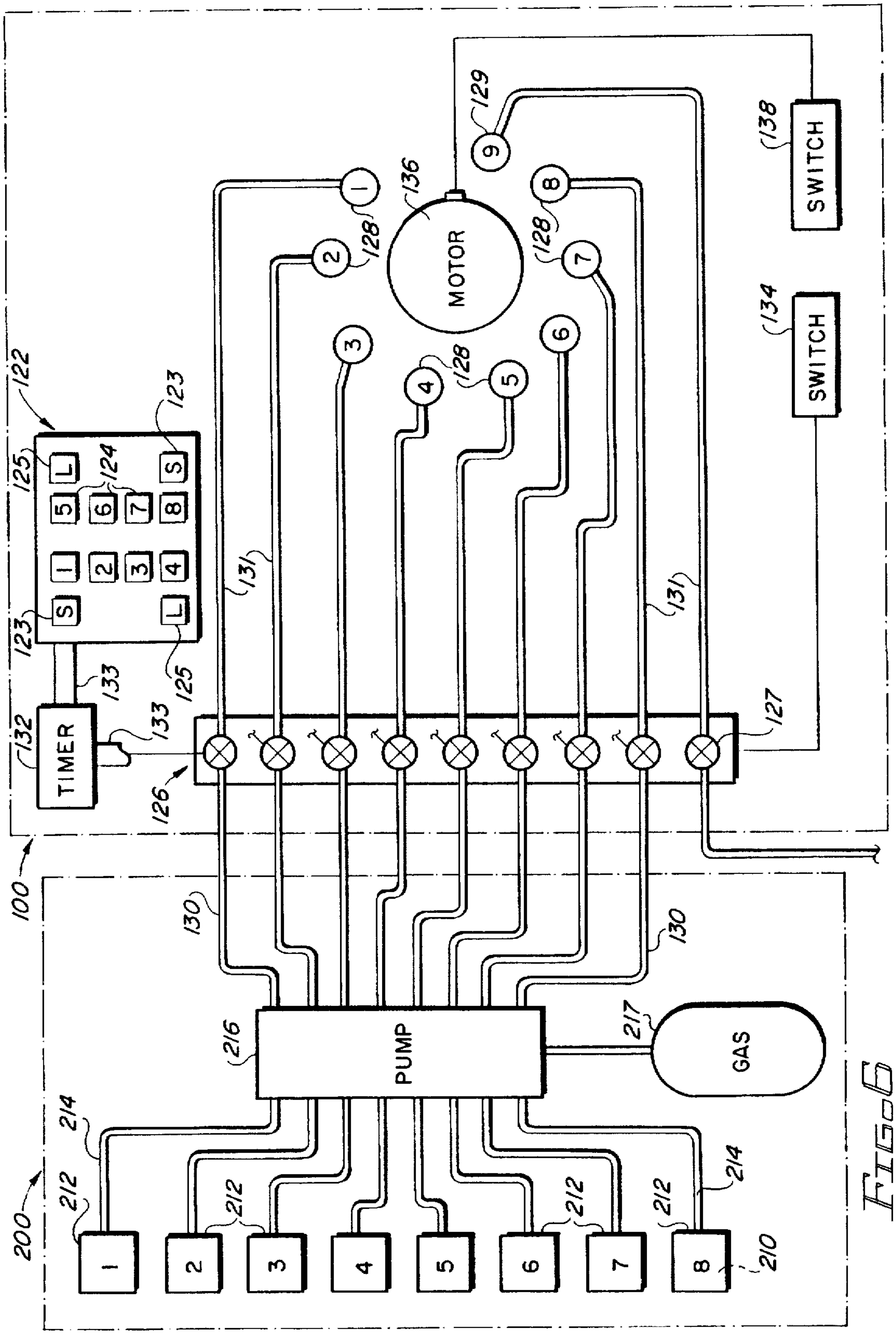
FIG. 6 is a schematic drawing illustrating operational elements of a preferred embodiment of the present invention.
Figure 7:
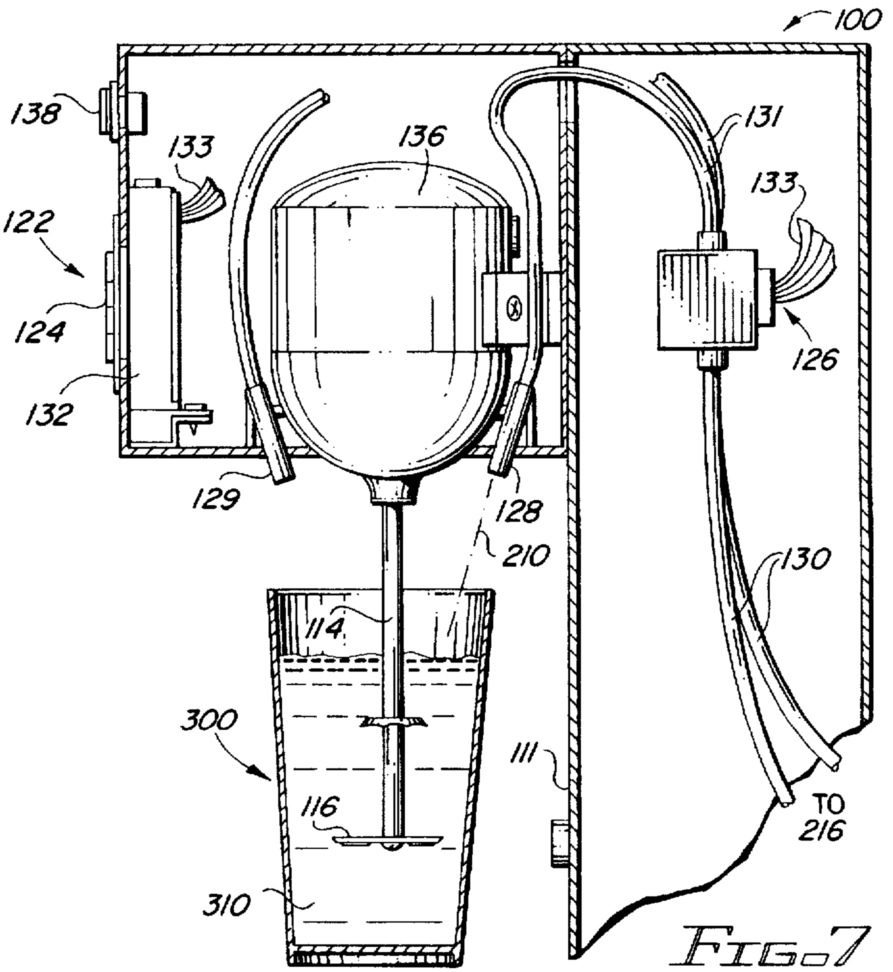
FIG. 7 is a partial side cross-sectional view of the apparatus of FIG. 2 identified as cross-section 7—7 in FIG. 8.
Figure 8:
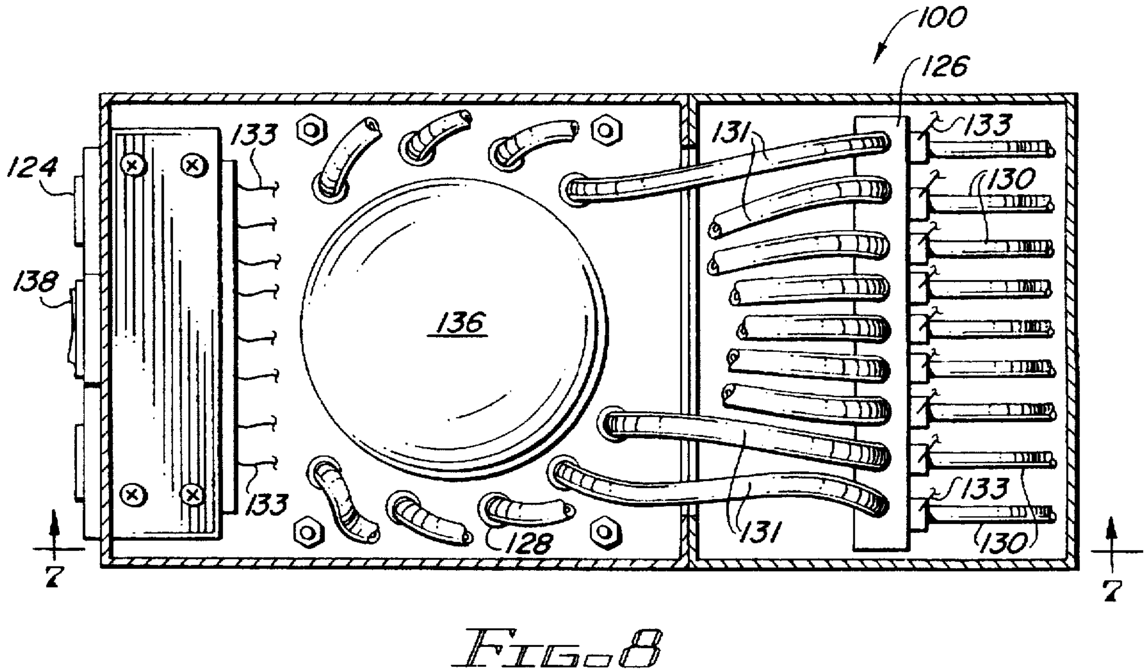
FIG. 8 is a top cross-sectional view of the apparatus of FIG. 2 identified as cross-section 8—8 in FIG. 3.

As illustrated again with reference to FIGS. 1–3, the apparatus 100 further comprises control means 120 including a syrup selector switch 122. The switch 122 includes a set of buttons 124 for the selection of different flavored syrups 210 stored within the reservoir 200. As illustrated with reference to FIG. 6, a schematic illustration of the operation of the apparatus 100 communicating with the reservoir 200. By way of example in a preferred embodiment of the present invention, eight disposable reservoir bags 212 are in fluid communication with eight corresponding solenoid valves 126 which control the flow of syrup 210 from the bag 212 to a corresponding nozzle 128. The eight valves 126 and eight nozzles 128 are carried by the housing 110 as illustrated with reference to FIGS. 7 and 8. Conduit 214 is provided from each bag 212 to a pump 216. Second conduit 130 is provided from each solenoid valve 126 to the pump 216, and third conduit 131 from the valve 126 to the nozzles 128. Each bag 212 has its corresponding conduit 214, 130,131, and nozzle 128. The pump 216 operates to continuously supply the syrup 210 from each bag 212 to each respective valve 126, thus providing pump means in fluid communication with the conduit 214,130 for drawing the syrup 210 from the reservoir 200 and continuously supplying the syrup 210 to the valve 126 which controls the flow of any selected syrup 210 to a corresponding nozzle 128.

The pump 216 in one preferred embodiment of the present invention provides an independent pump for each bag 212. The pump 216 in one preferred embodiment is a well known beverage gas pump supplying the syrup 210 under pressure with the typically non-pressurized bag-in-the-box reservoir bags 212. The pump 216 can be driven by carbon dioxide, nitrogen or compressed filtered air 217, and does not come in contact with the syrup 210. As is well known, separation of the syrup 210 and pumping gas eliminates contamination, foaming, and the need for purging of the conduit 130, 214 when the syrup bags 212 are empty. The pump 216 operates when the selected syrup 210 is needed, and in response to the valve 126 opening, thus permitting dispensing of syrup through the nozzle 128. The pump 216 pressurizes the syrup to match the pressure of the gas supplied to the pump 216. When the valve 126 is closed, the incoming gas and output syrup pressures equalize and the pump stops. As the bags 212 empty, the pump 216 draws a vacuum and collapses the bag 212, thus completely evacuating the syrup 210. The pump 216 will shut off once a pre-set vacuum point is achieved and held. When a new bag 212 is installed containing replacement syrup, the vacuum drops and the pump 216 restarts and pressurizes the reservoir 200. A WICOR Company SHURflo (R) Beverage Gas Pump 166-200-XX is appropriate for use.

Again with reference to FIG. 6, a controller or programmable timer 132, also carried by the housing 110, is programmed for actuating the selected solenoid valve 126 through electrical connection means 133 and holding the valve 126 open for a pre-selected period of time. The timer 132 is activated by the selector switch 122 which in a preferred embodiment is operated as a momentary switch 122. By way of example, the pre-selected time period in a preferred embodiment operated the valve 126 for dispensing an once of syrup into the cup 300 having a sixteen once capacity and approximately thirteen ounces of the neutral flavored mix 310. In addition to the flavor select buttons 124, a short period button 123 and a long period button 125 are provided, as illustrated with reference to FIG. 6 and FIG. 2. The short button 123 signals the timer 132 programmed to reduce the time period that the valve 126 remains open for dispensing a half ounce of the selected syrup 210. The long button 125 signals the timer 132 programmed to increase the time period that the valve 126 remains open for dispensing two ounces of the selected syrup 210.

Yet again with reference to FIG. 6, a water supply or sterilizing solution is dispensed through the valve 127 for delivery of the sterilizing solution or fresh water through a dedicated nozzle 129 for flushing and cleaning the spindle 114 after each use in preparing a flavored shake. A switch 134 carried by the housing 110 activates the valve 127 for permitting the sterilizing solution to be dispensed through the nozzle 129 for cleaning the spindle 114, as illustrated with reference to FIG. 7. As further illustrated with reference to FIGS. 6 and 7, a blender motor 136 carried by the housing 110 is activated by a motor switch 138 carried by the housing 110. As illustrated again with reference to FIG. 7, each nozzle 128, 129 is angled for dispensing the selected syrup 210 toward the spindle 114. In the case of the sterilizer nozzle 129, such an angle permits the spindle 114 and spindle blades 116 to be hit directly with water or sterilizing solution. In addition, once the sterilizing solution has been added to an empty container used to clean the spindle 114, the motor switch 138 is pressed and spindle and blades operated within the solution until clean.

Figure 4:
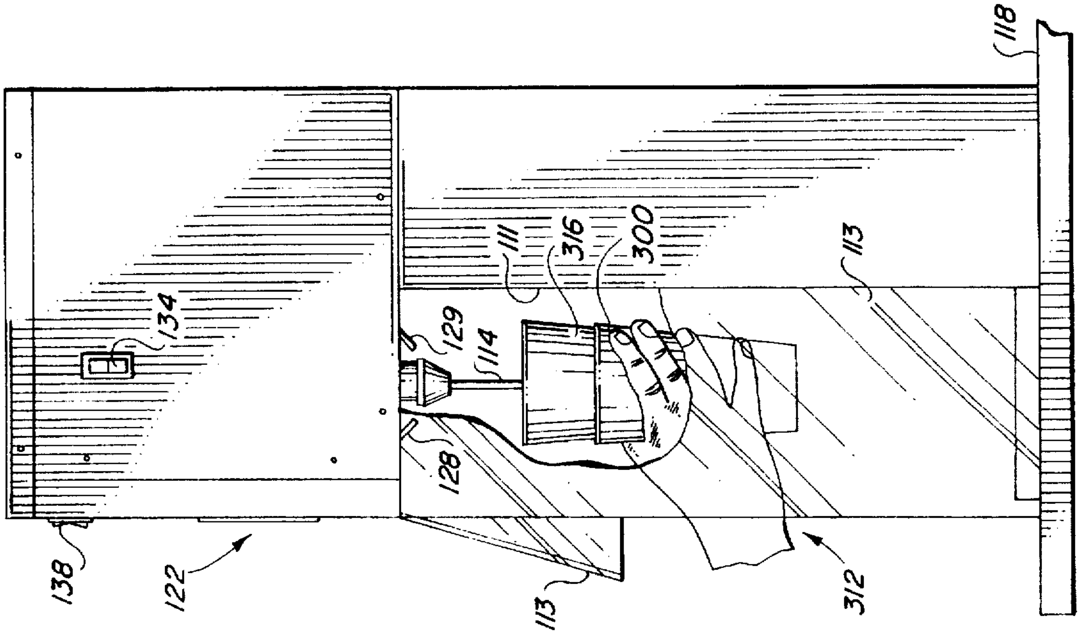
FIG. 4 is a side view of the apparatus of FIG. 2 illustrating a blending operation.

In operation of a preferred embodiment of the present invention, and as again illustrated with reference to FIGS. 1 and 4, the system 10 anticipates the storing of a multiplicity of flavored syrups 210 in bag-in-the-box styled reservoir bags 212 conveniently located, yet out of sight from a retail serving operation. The syrup 210, a variety of flavors including, by way of example, banana, cherry, chocolate, coffee, peppermint, raspberry, strawberry, and vanilla, within their own designated bag 212 are in fluid communication with the corresponding nozzles 128 for dispensing of a selected syrup 210 from the nozzle 128 into the cup 300 hand held to receive the spindle 114 and thus the dispensed syrup 210. With the eight syrups 210 suggested by way of example, approximately thirty six combination flavored shakes can be created by adding various portions of selected syrups 210 (e.g. standard button 124 selected, short button 123, long button 125, and combinations of buttons as desired), and dispensing the selected syrup 210 into the hand held cup 300 containing the neutral flavored shake mix 310. Once a particular flavor has been identified, an appropriate button 124 is pushed which causes the programmable timer 132, described earlier with reference to FIG. 6, to open the solenoid valve 126 corresponding to that selected syrup 210. The pump 216 dedicated to that syrup 210 causes the syrup 210 to flow from its individual bag 212 through conduit 214, 130, and 131 through the nozzle 128. As earlier described with reference to FIGS. 6 and 8, the nozzles 128 are arranged with each nozzle 128 directed at the spindle 114. In this way, a customized, multi-flavored shake is readied for blending into the shake of choice.

With the sleeve 316 placed within the selected cup 300, the work area and counter surface 118, as well as the cup 300 itself is maintained in a clean, presentable condition for customer service. Once the blending is complete, the sleeve 316 is removed and the cup 300, now having a flavored shake of choice is served to the customer within the cup 300 that was used for originally storing the neutral shake mix 310. Further, it is anticipated that the cup 300 containing the neutral flavored mix 310 will be prepared and initially shipped and stored in a food freezer at temperatures for preserving the mix 310 for extended periods of time. Prior to the blending of a selected flavored syrup with the mix, the temperature of the mix will be reduced to a tempered temperature level for preferred blending of flavors with the mix. The tempering freezer 400, conveniently located proximate the blending and serving area, provides that tempering function.

With such a system 10, a cost effective, health conscience approach for preparing a flavored shake is provided. While specific method steps of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful methods and reasonable equivalents thereof obvious to those skilled in the art, are set forth in the appended claims.

What is claimed is:

1. An apparatus for preparing a flavored food, the apparatus comprising:

- a housing;
- a nozzle carried by the housing and positioned for directing a food flavoring into a cup;
- a valve operable with the nozzle for controlling a flow of the food flavoring therethrough;
- a blender carried by the housing, the blender having a spindle positioned for operating within the cup for blending the food flavoring dispensed into the cup with a mix stored therein;
- a reservoir for storing the food flavoring therein;
- a conduit operational between the reservoir and the valve; and
- a pump in fluid communication with the reservoir through the conduit for pumping the food flavoring from the reservoir to the valve for dispensing the food flavoring through the nozzle.

2. A flavored food preparation apparatus according to claim 1, further comprising:

- a timer operational with the valve for actuating the opening and closing of the valve; and
- a valve control switch carried by the housing for activating the timer.

3. A flavored food preparation apparatus according to claim 2, wherein the timer comprises a programmable timer.

4. A flavored food preparation apparatus according to claim 1, wherein the nozzle comprises multiple nozzles directed outwardly from the housing toward the spindle.

5. A flavored food preparation apparatus according to claim 1, further comprising a blender switch carried by the housing for manual activation of the blender.

6. A flavored food preparation apparatus according to claim 1, wherein the valve is carried by the housing.

7. A flavored food preparation apparatus according to claim 1, wherein the valve comprises a solenoid valve.

8. An apparatus for preparing a flavored food, the apparatus comprising:

a housing;

a nozzle carried by the housing and positioned for directing a food flavoring into a cup;

a valve operable with the nozzle for controlling a flow of the food flavoring therethrough; and a blender carried by the housing, the blender having a spindle positioned for operating within the cup for blending the food flavoring dispensed into the cup with a mix stored therein.

9. A flavored food preparation apparatus according to claim 8, further comprising:

a reservoir for storing the food flavoring therein;

a conduit operational between the reservoir and the valve; and a pump in fluid communication with the reservoir through the conduit for pumping the food flavoring from the reservoir to the valve for dispensing the food flavoring through the nozzle.

10. A flavored food preparation apparatus according to claim 8, further comprising:

a timer operational with the valve for actuating the opening and closing of the valve; and a valve control switch carried by the housing for activating the timer.

11. A flavored food preparation apparatus according to claim 10, wherein the timer comprises a programmable timer.

12. A flavored food preparation apparatus according to claim 11, wherein the valve comprises a solenoid valve operational with the programmable timer for providing a preselected valve opening and thus flow of the flavored food through the valve and nozzle.

13. A flavored food preparation apparatus according to claim 8, wherein the nozzle comprises multiple nozzles directed outwardly from the housing toward the spindle.

14. A flavored food preparation apparatus according to claim 8, further comprising:

the blender having a motor carried within the housing and the spindle extending vertically outward from the housing switch carried by the housing for manual activation of the blender; and a blender switch carried by the housing for controlling operation of the blender motor.

15. A flavored food preparation apparatus according to claim 8, wherein the valve is carried by the housing.

16. An apparatus for preparing a flavored food, the apparatus comprising:

a housing;

a nozzle carried by the housing and positioned for directing a food flavoring into a cup; and a blender carried by the housing, the blender having a spindle positioned for operating within the cup for blending the food flavoring dispensed into the cup with a mix stored therein.

17. A flavored food preparation apparatus according to claim 16, further comprising:

a reservoir for storing the food flavoring therein;

a conduit operational between the reservoir and the nozzle; and a pump in fluid communication with the reservoir through the conduit for pumping the food flavoring from the reservoir to the nozzle for dispensing the food flavoring therethrough.

18. A flavored food preparation apparatus according to claim 16, further comprising:

a valve operable with the nozzle for controlling a flow of flavored food therethrough;

a timer operational with the valve for actuating the opening and closing of the valve; and a valve control switch carried by the housing for activating the timer.

19. A flavored food preparation apparatus according to claim 18, wherein the timer comprises a programmable timer.

20. A flavored food preparation apparatus according to claim 16, wherein the nozzle comprises multiple nozzles directed outwardly from the housing toward the spindle.

21. A flavored food preparation apparatus according to claim 16, further comprising a blender switch carried by the housing for manual activation of the blender.

22. An apparatus for preparing a flavored food, the apparatus comprising:

a housing;

a nozzle carried by the housing and positioned for dispensing a preselected food flavoring therethrough;

a valve carried by the housing and operable with the nozzle for controlling a flow therethrough of the preselected food flavoring;

a reservoir for storing for storing multiple food flavorings therein;

conduit operational between the reservoir and the valve;

a pump in fluid communication with the reservoir through the conduit for pumping a selected food flavoring from the reservoir to the valve for dispensing the selected food flavoring through the nozzle; and a blender carried by the housing for blending the preselected food flavoring dispensed therefrom.

23. A flavored food preparation apparatus according to claim 22, further comprising:

a timer operational with the valve for actuating the opening and closing of the valve; and a valve control switch carried by the housing for selecting the preselected food flavoring to be dispensed and activating the timer for operation of the valve.

24. A flavored food preparation apparatus according to claim 22, wherein the timer comprises a programmable timer.

25. A flavored food preparation apparatus according to claim 22, wherein the nozzle comprises multiple nozzles directed outwardly from the housing toward the spindle.

* * * * *